(12) United States Patent
Mileva et al.

(10) Patent No.: US 10,941,288 B2
(45) Date of Patent: *Mar. 9, 2021

(54) STIFF PROPYLENE COMPOSITION WITH GOOD DIMENSIONAL STABILITY AND EXCELLENT SURFACE APPEARANCE

(71) Applicant: BOREALIS AG, Vienna (AT)

(72) Inventors: Daniela Mileva, Pichling (AT); Georg Grestenberger, St. Peter in der Au (AT); Thomas Lummerstorfer, Gramastetten (AT)

(73) Assignee: Borealis AG, Vienna (AT)

( * ) Notice: Subject to any disclaimer, the term of this patent is extended or adjusted under 35 U.S.C. 154(b) by 43 days.

This patent is subject to a terminal disclaimer.

(21) Appl. No.: 16/316,871

(22) PCT Filed: Jul. 14, 2017

(86) PCT No.: PCT/EP2017/067878
§ 371 (c)(1),
(2) Date: Jan. 10, 2019

(87) PCT Pub. No.: WO2018/019618
PCT Pub. Date: Feb. 1, 2018

(65) Prior Publication Data
US 2019/0233630 A1 Aug. 1, 2019

(30) Foreign Application Priority Data

Jul. 25, 2016 (EP) .................................... 16181015

(51) Int. Cl.
| | | |
|---|---|---|
| *C08L 23/12* | (2006.01) | |
| *C08L 23/30* | (2006.01) | |
| *C08L 23/14* | (2006.01) | |
| *C08F 210/02* | (2006.01) | |
| *C08F 210/06* | (2006.01) | |
| *C08F 210/16* | (2006.01) | |
| *C08K 3/34* | (2006.01) | |
| *C08K 5/14* | (2006.01) | |

(52) U.S. Cl.
CPC ........... *C08L 23/30* (2013.01); *C08F 210/02* (2013.01); *C08F 210/06* (2013.01); *C08F 210/16* (2013.01); *C08K 3/34* (2013.01); *C08K 5/14* (2013.01); *C08L 23/12* (2013.01); *C08L 23/142* (2013.01); *C08F 2500/12* (2013.01); *C08F 2800/10* (2013.01); *C08L 2205/03* (2013.01); *C08L 2205/035* (2013.01); *C08L 2207/02* (2013.01)

(58) Field of Classification Search
CPC .... C08F 210/02; C08F 210/16; C08F 210/06; C08F 2500/12; C08K 3/34; C08K 5/14; C08L 23/30; C08L 23/142; C08L 23/12; C08L 23/16; C08L 2205/03; C08L 2207/02; C08L 2205/035
See application file for complete search history.

(56) References Cited

U.S. PATENT DOCUMENTS

| | | | |
|---|---|---|---|
| 5,272,236 A | 12/1993 | Lai et al. | |
| 2004/0092631 A1* | 5/2004 | Joseph | ............... C08K 5/0008 524/230 |
| 2019/0241726 A1* | 8/2019 | Lummerstorfer et al. | ............... C08K 5/14 |

FOREIGN PATENT DOCUMENTS

| | | |
|---|---|---|
| EP | 0491566 A2 | 6/1992 |
| EP | 0739941 A1 | 10/1996 |
| EP | 0887379 A1 | 12/1998 |
| EP | 1634919 A1 | 3/2006 |
| RU | 2588568 C2 | 5/2016 |
| WO | 8707620 A1 | 12/1987 |
| WO | 9212182 A1 | 7/1992 |
| WO | 9219653 A1 | 11/1992 |
| WO | 9219658 A1 | 11/1992 |
| WO | 9924478 A1 | 5/1999 |
| WO | 9924479 A1 | 5/1999 |
| WO | 0068315 A1 | 11/2000 |
| WO | 2004000899 A1 | 12/2003 |
| WO | 2004111095 A1 | 12/2004 |
| WO | 2010142540 A1 | 12/2010 |
| WO | 2010149529 A1 | 12/2010 |

OTHER PUBLICATIONS

Office Action for Russian Application No. 2019104124/04 dated Apr. 22, 2019, 6 pages.
Shefer, et a., "Effect of Cross-Links on the Glass Transition Temperature of End-Linked Elastomers," Macromolecules, 1992, 25, pp. 4036-4042.
DiMarzio E.A., "On the second-order transition of a rubber," J. of Res. of the Nat. Bureau of Standards—A. Phys and Chem, 1964, vol. 68A, No. 6, pp. 611-617.
Zweifel, et al., "Plastic Additives Handbook," 5th edition, Hanser Publications, 2001, pp. 967 to 990.
Zweifel, et al., "Plastic Additives Handbook," 6th edition, Hanser Publications, 2009, pp. 1041-1090.
Singh, et al., "Triad Sequence Determination of Ethylene-Propylene Copolymers—Application of Quantitative 13C NMR," Polymer Testing, 2009, vol. 29, pp. 475-479.
Resconi, et al., "Selectivity in Propene Polymerization with Metallocene Catalysts," Chem. Rev., 2000, vol. 100, pp. 1253-1345.
Cheng, H.N., "C NMR Analysis of Ethylene-Propylene Rubbers," Macromolecules, 1984, vol. 17, 1984, pp. 1950-1955.
Wang, et al., "Structural Analysis of Ethylene/Propylene Copolymers Synthesized with a Constrained Geometry Catalyst," Macromolecules, 2000, vol. 33, pp. 1157-1162.

(Continued)

*Primary Examiner* — Nathan M Nutter
(74) *Attorney, Agent, or Firm* — Lowenstein Sandler LLP

(57) ABSTRACT

The present invention is directed to a stiff propylene composition with good dimensional stability and excellent surface appearance, said composition comprising a modified polypropylene composition and an inorganic filler.

17 Claims, No Drawings

(56) References Cited

OTHER PUBLICATIONS

Zhou, et al., "A new decoupling method for accurate quantification of polyethylene copolymer composition and triad sequence distribution with 13C NMR," Journal of Magnetic Resonance, 2007, vol. 187, 2007, pp. 225-233.

Busico, et al., "Alk-1-ene Polymerization in the Presence of a Monocyclopentadienyl Zirconium (IV) Acetamidinate Catalyst: Microstructural and Mechanistic Insights," Macromolecular Rapid Commun., 2007, vol. 28, pp. 1128-1134.

Klimke, et al., "Optimisation and Application of Polyolefin Branch Quantification by Melt-State 13C NMR Spectroscopy," Macromolecular Chemistry and Physics, 2006, vol. 207, pp. 382-395.

Parkinson, et al., "Effect of Branch Length on 13C NMR Relaxation Properties in Moten Poly[ethylene-co-(alpha-olefin)] Model Systems," Macromolecular Chemistry and Physics, 2007, vol. 208, pp. 2128-2133.

Castignolles, et al., "Detection and quantification of branching in polyacrylates by size-exclusion chromatography (SEC) and melt-state 13C NMR spectroscopy," Polymer, 2009, vol. 50, pp. 2373-2383.

Pollard, et al., "Observation of Chain Branching in Polyethylene in the Solid State and Melt via 13C NMR Spectroscopy and Melt NMR Relaxation Time Measurements," Macromolecules, 2004, vol. 37, pp. 813-825.

Filip, et al., "Heteronuclear decoupling under fast MAS by a rotor-synchronized Hahn-echo pulse train," Journal of Magnetic Resonance, 2005, vol. 176, pp. 239-243.

Randall, et al., "A Review of High Resolution Liquid 13Carbon Nuclear Magnet Resonance Characterizations of Ethylene-Based Polymers", Rev. Macromol. Chem. Phys., 1989, C29, pp. 201-317.

European Search Report for European Patent Application No. 16181015.5, dated Feb. 3, 2017, 6 pages.

Griffin, et al., "Low-load Rotor-Synchronised Hahn-echo Pulso Train (RS-HEPT) 1H Decoupling in Solid-State NMR: factors affecting MAS Spin-echo Dephasing Times," Magnetic Resonance in Chemistry, 2007, vol. 45, pp. S198-S208.

Frank, et al., "New measurement method for appearance of flow marks or tiger stripes defect for improved quantification and analysis," 25th Annual Meeting of the Polymer Processing Society, 2009, 10 pages.

Kakugo, et al., "C NMR Determination of Monomer Sequence Distribution in Ethylene-Propylene Copolymers Prepared with s-TiCL13-AL (C2H5)2C1," Macromolecules, 1982, vol. 15, pp. 1150-1152.

\* cited by examiner

STIFF PROPYLENE COMPOSITION WITH GOOD DIMENSIONAL STABILITY AND EXCELLENT SURFACE APPEARANCE

CROSS-REFERENCE TO RELATED APPLICATIONS

This application is a national phase entry under 35 U.S.C. § 371 of International Application No. PCT/EP2017/067878, filed on Jul. 14, 2017, which claims the benefit of priority of European Patent Application No. 16181015.5, filed on Jul. 25, 2016. The contents of these applications are hereby incorporated by reference herein in their entirety.

The present invention is directed to a composition comprising a modified polypropylene composition and an inorganic filler. Said modified polypropylene composition is obtained by treatment of a polypropylene composition comprising a heterophasic composition and a plastomer with a peroxide. The invention is also directed to an article made from said composition as well. Further, the invention is directed to a process for preparing said composition as well as the use of a peroxide to reduce the tigerskin of a polypropylene composition.

The application of non-painted plastic materials in exterior automotive applications is constantly increasing. Some of those materials are used for body panels or tailgate applications, which require high stiffness, high impact strength and good dimensional stability. Such materials are typically based on polypropylene compositions comprising a heterophasic system. Such a heterophasic polymer composition comprises an at least partly crystalline matrix and an amorphous phase dispersed therein. The matrix is usually a propylene polymer and the amorphous phase a propylene copolymer rubber.

Next to said heterophasic composition, plastic materials tailored for exterior automotive applications typically comprise at least one thermoplastic elastomer and a high amount of inorganic filler. One common problem of such blends is flow marks, commonly referred to as "tigerstripes", i.e. alternating glossy and hazy sections on the surface of injection moulded parts. Flow marks are essentially deteriorating the surface of the final part, thus, the composition design needs to provide a robust solution to reduce or eliminate the tiger stripes while still covering the stringent mechanical profile. Next to the tigerstripe-free surface, the composition needs to have low shrinkage, low thermal expansion coefficient (CLTE), high impact strength and stiffness. The need to reduce the thermal expansion coefficient (CLTE) and shrinkage is of high interest, especially when plastics are combined with metals in vehicles. One of the traditional concepts for reducing the coefficient of thermal expansion and shrinkage is to add an additional component such as inorganic filler or external thermoplastic elastomer to the base resin. However, higher concentrations of inorganic fillers or elastomer are not desirable due to negative effect on the surface appearance of the part. Thus, fulfillment of the complete thermo-mechanical and dimensional-stability material profile together with development of a perfect surface has always been a challenge due to the antagonistic effects of the particular properties.

One common approach to suppress tiger stripe formation is the use of specially designed heterophasic polypropylene compositions, often referred to as "tigerstripe killers". Such modifiers have a propylene-rich, highly viscous dispersed rubber phase. They are added to polypropylene compounds in certain amounts in order to reduce the elongation of the dispersed phase particles under shear stress during injection moulding, which results in morphology favoring good surface appearance. However, modifiers with such polymer design have high ability to shrink and high viscosity which corresponds to a low melt flow rate. Therefore, the use of such compositions where low shrinkage and CLTE are required is limited. Especially for automotive exterior applications (typically tailgate or body panel parts) with a very demanding mechanical property profile (low shrinkage and CLTE) this approach can face some limitations.

To reduce or eliminate flow marks in such compounds, a different approach is needed. Therefore, it is an object the present invention to provide a polymer composition comprising a high amount of inorganic filler which can be injection molded to obtain automotive compounds showing reduced tigerskin while the mechanical properties are kept on a high level.

Accordingly, the present invention is directed to a composition (C), comprising a modified polypropylene composition (mPP) and an inorganic filler (F), wherein said modified polypropylene composition (mPP) is obtained by treatment of a polypropylene composition (PP) with a peroxide (PO), said polypropylene composition (PP) comprising
  (a) a heterophasic composition (HECO), comprising
    (a1) a (semi)crystalline polypropylene (PP1) and
    (a2) an ethylene/propylene copolymer (EPR) dispersed in said (semi)crystalline polypropylene (PP1), and
  (b) a plastomer (PL) being a copolymer of ethylene and at least one C4 to C20 α-olefin.

It is especially preferred that the melt flow rate $MFR_2$ (230° C.) of said modified polypropylene composition (mPP) measured according to ISO 1133 is above 9.0 g/10 min, and that the intrinsic viscosity IV determined according to DIN ISO 1628/1 (in Decalin at 135° C.) of the xylene soluble fraction XCS of said modified polypropylene composition (mPP) is below 3.3 dl/g.

Alternatively to the previous paragraphs, the present invention is directed to a composition (C) comprising a modified polypropylene composition (mPP) and an inorganic filler (F), wherein said modified polypropylene composition (mPP) is obtained from a polypropylene composition (PP) comprising
  (a) a heterophasic composition (HECO), comprising
    (a1) a (semi)crystalline polypropylene (PP1) and
    (a2) an ethylene/propylene copolymer (EPR) dispersed in said (semi)crystalline polypropylene (PP1), and
  (b) a plastomer (PL) being a copolymer of ethylene and at least one C4 to C20 α-olefin, wherein
    (i) the melt flow rate $MFR_2$ (230° C.) of said modified polypropylene composition (mPP) measured according to ISO 1133 is above 9.0 g/10 min, and
    (ii) the intrinsic viscosity IV determined according to DIN ISO 1628/1 (in Decalin at 135° C.) of the xylene soluble fraction XCS of said modified polypropylene composition (mPP) is below 3.3 dl/g.

It is especially preferred that said modified polypropylene composition (mPP) is obtained by treatment of the polypropylene composition (PP) with a peroxide (PO).

According to one embodiment of the present invention, said plastomer (PL) is a copolymer of ethylene and 1-butene or 1-octene.

According to a further embodiment of the present invention, the polypropylene composition (PP) comprises the heterophasic composition (HECO) and the plastomer (PL) in a weight ratio from of 2.0 to 50.0.

According to another embodiment of the present invention, the composition (C) has a melt flow rate MFR$_2$ (230° C.) measured according to ISO 1133 in the range of 5 to 30 g/10 min.

According to still another embodiment of the present invention, the ratio IV(XCS)/IV(XCI) of the modified polypropylene composition (mPP) is below 2.3, wherein IV(XCS) is the intrinsic viscosity IV determined according to DIN ISO 1628/1 (in Decalin at 135° C.) of the xylene soluble fraction XCS and IV(XCI) is the intrinsic viscosity IV determined according to DIN ISO 1628/1 (in Decalin at 135° C.) of the xylene insoluble fraction XCI.

It is especially preferred that the composition (C) comprises
(a) 35 to 80 wt.-% of the modified polypropylene composition (mPP), and
(b) 20 to 50 wt.-% of the inorganic filler (F),
based on the total weight of the composition (C).

According to one embodiment of the present invention, the heterophasic composition (HECO) has
(a) a comonomer content, based on the total weight of the heterophasic composition (HECO), in the range of 10 to 30 mol-%, and/or
(b) a xylene soluble fraction (XCS) in the range of 24 to 45 wt.-%, and/or
(c) a melt flow rate MFR$_2$ (230° C.) measured according to ISO 1133 from 5 to 30 g/10 min According to another embodiment of the present invention, the xylene soluble fraction (XCS) of the heterophasic composition (HECO) has
(a) an intrinsic viscosity (IV) in the range of 1.5 to 4.5 dl/g,
(b) a comonomer content, based on the total weight of the xylene soluble fraction (XCS) of the heterophasic composition (HECO), in the range of 30 to 60 mol-%.

According to a further embodiment of the present invention, the plastomer (PL) has
(a) a melt flow rate MFR (190° C.) measured according to ISO 1133 from 0.1 to 5.0 g/10 min,
(b) a comonomer content, based on the total weight of the plastomer (PL), in the range of 8 to 30 mol-%, and
(c) a density below 0.868 g/cm$^3$.

It is especially preferred that the inorganic filler (F) is talc.

The present invention is also directed to an article comprising the composition (C) as described above, said article preferably being an injection moulded automotive article.

The present invention is further directed to the use of a peroxide (PO) to reduce tigerskin of a polypropylene composition (PP), wherein a composition (C) as defined above is obtained.

Preferably, the reduction of tigerskin is accomplished in case of MSE values equal or below 30.

Further, the present invention is directed to a process for the preparation of the composition (C) as described above, wherein
(a)
(a1) the polypropylene composition (PP) comprising the heterophasic composition (HECO) and the plastomer (PL) is extruded in an extruder in the presence of the peroxide (PO), thereby obtaining the modified polypropylene composition (mPP), and
(a2) said modified polypropylene composition (mPP) is melt blended with the inorganic filler (F), or
(b) the polypropylene composition (PP) comprising the heterophasic composition (HECO) and the plastomer (PL) and the inorganic filler (F) are extruded in an extruder in the presence of the peroxide (PO).

It is especially preferred that said peroxide (PO) is an alkyl peroxide, preferably said peroxide (PO) is 2,5-dimethyl-2,5-di-(tert-butylperoxy)hexane.

The present invention demonstrates a new to increase the robustness towards shear-elongation and finally tigerstripe formation. Further, the present invention shows that it is possible to obtain a heterophasic polypropylene composition with low shrinkage, low coefficient of linear thermal expansion, at the same time preserving good impact/stiffness balance and last but not least having excellent surface appearance.

The invention will now be described in more detail.

The Composition

The composition (C) according to the present invention comprises a modified polypropylene composition (mPP) and an inorganic filler (F). Said modified polypropylene composition (mPP) is obtained by treating a polypropylene composition (PP) with a peroxide (PO). Said polypropylene composition (PP) must comprise the heterophasic composition (HECO) and the plastomer (PL).

The composition (C) of the present invention must comprise the modified polypropylene composition (mPP) and the inorganic filler (F). In addition the composition may comprise alpha nucleating agents (NU) and additives (AD). Accordingly, it is preferred that the modified polypropylene composition (mPP) and the inorganic filler (F) make up together at least 80 wt.-%, more preferably at least 85 wt.-%, still more preferably at least 90 wt.-%, like at least 95 wt.-% of the composition (C). In one specific embodiment the composition (C) consists of the modified polypropylene composition (mPP) and the inorganic filler (F) and the optional alpha nucleating agents (NU) and/or additives (AD).

Preferably the weight ratio between the modified polypropylene composition (mPP) and the inorganic filler (F) [(mPP)/(F)] is in the range of 0.8 to 5.0, more preferably in the range of 1.0 to 4.0, more preferably in the range of 1.2 to 3.0.

Accordingly, the composition (C) preferably comprises
(a) 35 to 80 wt.-%, more preferably 40 to 70 wt.-%, still more preferably 45 to 65 wt.-%, like 48 to 61 wt.-%, based on the total weight of the composition (C), of the modified polypropylene composition (mPP), and
(b) 20 to 50 wt.-%, more preferably 25 to 45 wt.-%, still more preferably 30 to 40 wt.-%, like 32 to 39 wt.-%, based on the total weight of the composition (C), of the inorganic filler (F).

As outlined above, the modified polypropylene composition (mPP) is obtained by treatment of the polypropylene composition (PP) with a peroxide (PO). Preferred peroxides (PO) are listed below under the section "modified polypropylene composition (mPP)".

The peroxide (PO) is preferably introduced in the form of a master batch. That is the peroxide (PO) is pre-mixed with a polymeric carrier material. Said polymeric carrier material does not contribute to the improved properties of the composition (C). Preferably the polymeric carrier material is a polyethylene or a polypropylene, the latter being preferred. Typically the polymeric carrier material is different to heterophasic composition (HECO) and the plastomer (PL). Preferably the polymeric carrier material is a propylene homopolymer. The amount of said polymeric carrier material is preferably in the range of 1 to 15 wt.-%, more preferably in the range of 2 to 12 wt.-%, based on the based on the total weight of the composition (C).

Thus the composition (C) preferably comprises
(a) 35 to 80 wt.-%, more preferably 40 to 70 wt.-%, still more preferably 45 to 65 wt.-%, like 48 to 61 wt.-%, based on the total weight of the composition (C), of the modified polypropylene composition (mPP),
(b) 20 to 50 wt.-%, more preferably 25 to 45 wt.-%, still more preferably 30 to 40 wt.-%, like 32 to 39 wt.-%, based on the total weight of the composition (C), of the inorganic filler (F), and
(c) 1 to 15 wt.-%, more preferably in the range of 2 to 12 wt.-%, still more preferably in the range of 3 to 10, like in the range of 5 to 9 wt.-%, based on the based on the total weight of the composition (C), of the polymeric carrier material of the peroxide (P).

As mentioned above the composition (C) may comprise in addition alpha-nucleating agents (NU) and/or additives (AD). According to this invention, the alpha nucleating agent (NU) nor the filler (F) is an additive (AD). Further, according to this invention the filler (F) is not an alpha nucleating agent (NU). Accordingly it is preferred that the composition (C) contains up to 5.0 wt.-%, preferably $1.0\times10^{-5}$ to 4.0 wt.-%, more preferably $2.0\times10^{-5}$ to 2.0 wt.-%, based on the total weight of the composite, of alpha nucleating agents (NU) and/or up to 8.0 wt.-%, preferably 0.1 to 6.0 wt.-%, more preferably 0.5 to 4.0 wt.-%, based on the total weight of the composite, of additives (AD).

Therefore it is especially preferred that the composition consists of
(a) 35 to 80 wt.-%, more preferably 40 to 70 wt.-%, still more preferably 45 to 65 wt.-%, like 48 to 61 wt.-%, based on the total weight of the composition (C), of the modified polypropylene composition (mPP),
(b) 20 to 50 wt.-%, more preferably 25 to 45 wt.-%, still more preferably 30 to 40 wt.-%, like 32 to 39 wt.-%, based on the total weight of the composition (C), of the inorganic filler (F),
(c) 1 to 15 wt.-%, more preferably in the range of 2 to 12 wt.-%, still more preferably in the range of 3 to 10, like in the range of 5 to 9 wt.-%, based on the based on the total weight of the composition (C), of the polymeric carrier material of the peroxide (P),
(d) optionally up to 5.0 wt.-%, preferably $1.0\times10^{-5}$ to 4.0 wt.-%, more preferably $2.0\times10^{-5}$ to 2.0 wt.-% based on the total weight of the composite, of alpha nucleating agents (NU), and
(e) optionally up to 8.0 wt.-%, preferably 0.1 to 6.0 wt.-%, more preferably 0.5 to 4.0 wt.-%, based on the total weight of the composite, of additives (AD).

It is especially preferred that the composition (C) has a melt flow rate $MFR_2$ (230° C., 2.16 kg) in the range of 5.0 to 30.0 g/10 min, more preferably in the range of 6.0 to 20.0 g/10 min, still more preferably in the range of 8.0 to 17.0 g/10 min, like in the range of 10.0 to 15.0 g/10 min.

Preferably the composition (C) has a flexural modulus below 3200 MPa, more preferably in the range of 1500 to 3100 MPa, still more preferably in the range of 2000 to 3000 MPa, like in the range of 2500 to 2900 MPa.

Additionally or alternatively to the previous paragraph, the composition (C) has a notched Charpy impact strength (23° C.) of at least 10 kJ/m², more preferably in the range of 10 to 30 kJ/m², still more preferably in the range of 12 to 25 kJ/m², like in the range of 13 to 21 kJ/m².

The composition (C) according to the invention may be pelletized and compounded using any of the variety of compounding and blending methods well known and commonly used in this field. Preferably melt blending is applied by using an extruder.

In the following the individual components of the composition (C) are defined in more detail.

The Modified Polypropylene Composition (mPP)

As mentioned above, the modified polypropylene composition (mPP) is obtained by treating a polypropylene composition (PP) with a peroxide (PO). Said polypropylene composition (PP) must comprise the heterophasic composition (HECO) and the plastomer (PL). In a preferred embodiment the heterophasic composition (HECO) and the plastomer (PL) make up together at least 80 wt.-%, more preferably at least 85 wt.-%, still more preferably at least 90 wt.-%, like at least 95 wt.-% of the modified polypropylene composition (mPP). In one specific embodiment the modified polypropylene composition (mPP) consists of the heterophasic composition (HECO) and the plastomer (PL).

The polymeric carrier material of the peroxide (P), the alpha nucleating agents (NU) and the additives (AD) are not considered to be part of the modified polypropylene composition (mPP) but of the final composition (C).

The weight ratio of the heterophasic composition (HECO) and the plastomer (PL) [(HECO)/(PL)] in the modified polypropylene composition (mPP) is preferably in the range of 2.0 to 50.0, more preferably from 5.0 to 40.0, still more preferably from 8.0 to 30.0, like from 12.0 to 28.0.

As can be taken from the wording "modified" the polypropylene composition (mPP) is a composition, i.e. the polypropylene composition (PP), which has been chemically treated by the use of peroxide (PO). In the present case the modified polypropylene composition (mPP) is the polypropylene composition (PP) which has been chemically modified due to either partial cross-linking of individual polymer chains, branching of individual chains or development of favourable dispersed phase morphology by changing the viscosity ratios between the dispersed phase and the matrix of the polymer composition. The slight increase of the glass transition temperature (Tg) of the dispersed phase caused by the addition of peroxide can serve as an evidence for a change in the macromolecular level of the system. Increase of the Tg can be related to increase of the entanglements or partially crosslinking of the amorphous phase [Shefer A, Gottlieb M, Effect of cross-links on the glass transition temperature of end-linked elastomers, Macromolecules, 25, 4036-4042 (1992); DiMarzio E. A., On the second-order transition of a rubber, J. of Res. of the Nat. Bureau of Standards—A. Phys and Chem, 68A, 6, 1964].

As mentioned above to obtain the modified polypropylene composition (mPP) the polypropylene composition (PP) must be treated with peroxide.

Like the modified polypropylene composition (mPP), also the polypropylene composition (PP) must comprise the heterophasic composition (HECO) and the plastomer (PL). In a preferred embodiment the heterophasic composition (HECO) and the plastomer (PL) make up together at least 80 wt.-%, more preferably at least 85 wt.-%, still more preferably at least 90 wt.-%, like at least 95 wt.-% of the polypropylene composition (PP). In one specific embodiment the polypropylene composition (PP) consists of the heterophasic composition (HECO) and the plastomer (PL).

It is preferred that the modified polypropylene composition (PP) has a melt flow rate $MFR_2$ (230° C.) measured according to ISO 1133 above 9.0 g/10 min, more preferably in the range of 10.0 to 60 g/10 min, still more preferably in the range of 12.0 to 48.0 g/10 min, like in the range of 13.0 to 42 g/10 min.

Additionally to the previous paragraph, it is preferred that the modified polypropylene composition (PP) has a comonomer content in the range of 10.0 to 30.0 mol-%, more preferably in the range of 13.0 to 25.0 mol-%, still more preferably in the range of 15.0 to 20.0 mol-%.

Further, it is preferred that the intrinsic viscosity IV determined according to DIN ISO 1628/1 (in Decalin at 135° C.) of the xylene soluble fraction XCS of the modified polypropylene composition (PP) is below 3.3 dl/g, more preferably below 3.1 dl/g, still more preferably below 2.9 dl/g.

Additionally, it is preferred that the intrinsic viscosity IV determined according to DIN ISO 1628/1 (in Decalin at 135° C.) of the xylene insoluble fraction XCI of the modified polypropylene composition (PP) is below 2.0 dl/g, more preferably below 1.8 dl/g, still more preferably below 1.6 dl/g.

It is especially preferred that the ratio IV(XCS)/IV(XCI) of the modified polypropylene composition (mPP) is below 2.3, more preferably below 2.1, still more preferably below 2.0, wherein IV(XCS) is the intrinsic viscosity IV determined according to DIN ISO 1628/1 (in Decalin at 135° C.) of the xylene soluble fraction XCS and IV(XCI) is the intrinsic viscosity IV determined according to DIN ISO 1628/1 (in Decalin at 135° C.) of the xylene insoluble fraction XCI.

Additionally, it is preferred that the comonomer content of the xylene soluble fraction XCS of the modified polypropylene composition (mPP) is in the range of 20.0 to 70.0 mol-%, more preferably in the range of 35.0 to 60.0 mol-%, still more preferably in the range of 45.0 to 55.0 mol-%.

Further, it is preferred that that the comonomer content of the xylene insoluble fraction XCI of the modified polypropylene composition (mPP) is in the range of 3.0 to 15.0 mol-%, more preferably in the range of 6.0 to 12.0 mol-%, still more preferably in the range of 8.0 to 10.0 mol-%.

The individual properties of heterophasic composition (HECO) and the plastomer (PL) in the the polypropylene composition (PP) can be taken from the information below.

The peroxide (PO) for the modification of the polypropylene composition (PP) is preferably thermally decomposing free radical-forming agents. More preferably the peroxide (PO), i.e. the thermally decomposing free radical-forming agent, is selected from the group consisting of acyl peroxide, alkyl peroxide, hydroperoxide, perester and peroxycarbonate.

The following listed peroxides are in particular preferred:
Acyl peroxides: benzoyl peroxide, 4-chlorobenzoyl peroxide, 3-methoxybenzoyl peroxide and/or methyl benzoyl peroxide.

Alkyl peroxides: allyl t-butyl peroxide, 2,2-bis(t-butylperoxybutane), 2,5-dimethyl-2,5-di-(tert-butylperoxy) hexane, 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide.

Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate, or mixtures of these above listed free radical-forming agents.

In a preferred embodiment, the peroxide (PO) is an alkyl peroxide. It is especially preferred that the peroxide (PO) is 2,5-dimethyl-2,5-di-(tert-butylperoxy)hexane.

In a first embodiment of the of the modification process, the modified polypropylene composition (mPP) is obtained in a first step by extruding the polypropylene composition (PP) comprising the heterophasic composition (HECO) and the plastomer (PL) in an extruder in the presence of the peroxide (PO).

Said modified polypropylene composition (mPP) is subsequently (melt) blended with the inorganic filler (F) to obtain the final composition (C).

In a second embodiment of the process, the polypropylene composition (PP) comprising the heterophasic composition (HECO) and the plastomer (PL) and the inorganic filler (F) are extruded in an extruder in the presence of the peroxide (PO) to obtain the final composition (C).

The modification can be in particular effected by dosing the polypropylene composition (PP) or a mixture of the polypropylene composition (PP) and the inorganic filler (F) into a twin screw extruder like Prism TSE24 40D with preferably a temperature profile 80/200/210/220/220/230/230/220/225/220° C. and a screw speed of 300 rpm. A masterbatch in a powder form consisting of the peroxide (PO), like 2,5-dimethyl-2,5-di-(tert-butylperoxy)hexane and polypropylene is added directly into the extruder, achieving a concentration of 0.001 to 1.0 wt.-% of the peroxide (PO), based on the mixture. The polymer melt mixture is passed through the extruder, then to intensive devolatilisation, discharged and pelletized obtaining thereby the modified polypropylene composition (mPP) or the final composition (C).

The properties of the heterophasic composition (HECO), especially the properties of the ethylene/propylene copolymer (EPR) of the heterophasic composition (HECO), and the properties of the plastomer (PL) may change due to the use of the peroxide (PO). This applies in particular for the intrinsic viscosity and the melt flow rate of the ethylene/propylene copolymer (EPR) of the heterophasic composition (HECO) and the properties of the plastomer (PL). In some cases the melt flow rate $MFR_2$ (230° C.) of the (semi)crystalline polypropylene (PP1) might be enhanced due to the use of peroxide.

The Heterophasic Composition (HECO)

As mentioned above the properties of the heterophasic composition (HECO) may change due to the use of the peroxide (PO). That is the properties defined in this section may differ after the heterophasic composition (HECO) has been treated with the peroxide (PO). However, the total ethylene content is not changed. What to some extent may be effected is the properties of the ethylene/propylene copolymer (EPR) and thus of the xylene soluble fraction (XCS) of the heterophasic composition (HECO), e.g. the intrinsic viscosity (IV). Also the melt flow rate $MFR_2$ (230° C.) of the (semi)crystalline polypropylene (PP1) might be enhanced.

The heterophasic composition (HECO) preferably comprises a (semi)crystalline polypropylene (PP1) as a matrix in which an elastomeric propylene copolymer (EPR) is dispersed. Accordingly the elastomeric propylene copolymer (EPR) is (finely) dispersed in the (semi)crystalline polypropylene (PP1). In other words the (semi)crystalline polypropylene (PP1) constitutes a matrix in which the elastomeric propylene copolymer (EPR) forms inclusions in the matrix, i.e. in the (semi)crystalline polypropylene (PP1). Thus the matrix contains (finely) dispersed inclusions being not part of the matrix and said inclusions contain the elastomeric propylene copolymer (EPR). The term "inclusion" according to this invention shall preferably indicate that the matrix and the inclusion form different phases within the heterophasic composition (HECO), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Preferably, the heterophasic composition (HECO) has a melt flow rate $MFR_2$ (230° C., 2.16 kg) in the range of 5 to 30 g/10 min, more preferably in the range of 8 to 20 g/10 min, still more preferably in the range of 10 to 17 g/10 min.

As mentioned above, the heterophasic composition (HECO) according to this invention preferably comprises
 (a) a (semi)crystalline polypropylene (PP1) as the matrix (M) and
 (b) an elastomeric propylene copolymer (EPR).

Preferably the weight ratio between the (semi)crystalline polypropylene (PP1) and the elastomeric propylene copolymer (EPR) [PP1/EPR] of the heterophasic composition (HECO) is in the range of 80/20 to 40/60, more preferably in the range of 75/35 to 45/55, yet more preferably in the range of 70/30 to 50/50, like in the range of 70/30 to 60/40.

Preferably, the heterophasic composition (HECO) has an ethylene content of equal or below 30.0 mol.-%, more preferably in the range of 10.0 to 30.0 mol.-%, still more preferably in the range of 12.0 to 28.0 mol.-%, yet more preferably in the range of 15.0 to 25.0 mol.-%.

Preferably the heterophasic composition (HECO) has a xylene cold soluble (XCS) fraction (25° C.) in the range of 24 to 45 wt.-%, more preferably in the range of 26 to 40 wt.-%, still more preferably in the range of 27 to 38 wt.-% and most preferably in the range of 28 to 35 wt.-%.

Preferably the ethylene content of the xylene cold soluble fraction (XCS) of the heterophasic composition (HECO) is in the range of 30.0 to 60 mol.-%, more preferably in the range of 35.0 to 58.0 mol.-%, still more preferably in the range of 40.0 to 55.0 mol.-%, yet more preferably in the range of 45.0 to 55.0 mol.-%.

In a preferred embodiment the intrinsic viscosity (IV) of the xylene cold soluble fraction (XCS) of the heterophasic composition (HECO) is at least 2.0 dl/g, more preferably at least 2.5 dl/g. On the other hand the intrinsic viscosity (IV) should be not too high otherwise the flowability is decreased. Thus the intrinsic viscosity of xylene cold soluble fraction (XCS) of the heterophasic composition (HECO) is preferably in the range of 2.0 to 4.0 dl/g, more preferably in the range 2.6 to 3.8 dl/g and even more preferably in the range of 2.8 to 3.5 dl/g.

The (semi)crystalline polypropylene (PP1) is preferably a (semi)crystalline random propylene copolymer (R-PP1) or a (semi)crystalline propylene homopolymer (H-PP1), the latter especially preferred.

In case the (semi)crystalline polypropylene (PP1) is a (semi)crystalline random propylene copolymer (R-PP1) it is appreciated that the (semi)crystalline random propylene copolymer (R-PP1) comprises monomers co-polymerizable with propylene, for example co-monomers such as ethylene and/or $C_4$ to $C_{12}$ α-olefins, in particular ethylene and/or $C_4$ to $C_8$ α-olefins, e.g. 1-butene and/or 1-hexene. Preferably the (semi)crystalline random propylene copolymer (R-PP1) according to this invention comprises, especially consists of, monomers co-polymerizable with propylene from the group consisting of ethylene, 1-butene and 1-hexene.

More specifically the (semi)crystalline random propylene copolymer (R-PP1) of this invention comprises—apart from propylene—units derivable from ethylene and/or 1-butene.

In a preferred embodiment the (semi)crystalline random propylene copolymer (R-PP1) comprises units derivable from ethylene and propylene only.

Additionally it is appreciated that the (semi)crystalline random propylene copolymer (R-PP1) has preferably a comonomer content in the range of more than 0.3 to 1.5 mol.-%, more preferably in the range of more than 0.35 to 1.2 mol.-%, yet more preferably in the range of 0.4 to 1.0 mol.-%.

Further it is appreciated that the (semi)crystalline polypropylene (PP1), like (semi)crystalline propylene homopolymer (H-PP1), has a melt flow rate $MFR_2$ (230° C.) measured according to ISO 1133 of 20 to 100 g/10 min, more preferably of 30 to 80 g/10 min, still more preferably of 40 to 70 g/10 min, still more preferably of 50 to 60 g/10 min.

Further it is preferred that the semicrystalline polypropylene (PP1) according to this invention has a xylene soluble fraction (XCS) of not more than 10 wt.-%, in case of a (semi)crystalline propylene homopolymer (H-PP1) the xylene soluble fraction (XCS) is even lower, i.e. not more than 6.0 wt.

Accordingly it is preferred that the (semi)crystalline propylene homopolymer (H-PP1) has a xylene soluble fraction (XCS) of below 5.0 wt.-%, more preferably in the range of 0.5 to 4.5, like in the range of 1.0 to 3.5 wt.-%.

The second component of the heterophasic composition (HECO) is the elastomeric propylene copolymer (EPR).

The elastomeric propylene copolymer (EPR) comprises, preferably consists of, units derivable from (i) propylene and (ii) ethylene.

The ethylene content of the elastomeric propylene copolymer (EPR) of the heterophasic composition (HECO) is in the range of 30.0 to 60 mol.-%, more preferably in the range of 35.0 to 58.0 mol.-%, still more preferably in the range of 40.0 to 55.0 mol.-%, yet more preferably in the range of 45.0 to 55.0 mol-%, like in the range of 40.0 to 49.0 mol.-%.

The heterophasic composition (HECO) can be produced by blending the (semi)crystalline polypropylene (PP1) and the elastomeric propylene copolymer (EPR). However, it is preferred that the heterophasic composition (HECO) is produced in a sequential step process, using reactors in serial configuration and operating at different reaction conditions. As a consequence, each fraction prepared in a specific reactor may have its own molecular weight distribution and/or comonomer content distribution.

The heterophasic composition (HECO) according to this invention is preferably produced in a sequential polymerization process, i.e. in a multistage process, known in the art, wherein the (semi)crystalline polypropylene (PP1) is produced at least in one slurry reactor, preferably in a slurry reactor and optionally in a subsequent gas phase reactor, and subsequently the elastomeric propylene copolymer (EPR) is produced at least in one, i.e. one or two, gas phase reactor(s).

Accordingly it is preferred that the heterophasic composition (HECO) is produced in a sequential polymerization process comprising the steps of
(a) polymerizing propylene and optionally at least one ethylene and/or $C_4$ to $C_{12}$ α-olefin in a first reactor (R1) obtaining the first polypropylene fraction of the (semi) crystalline polypropylene (PP1), preferably said first polypropylene fraction is a propylene homopolymer,
(b) transferring the first polypropylene fraction into a second reactor (R2),
(c) polymerizing in the second reactor (R2) and in the presence of said first polypropylene fraction propylene and optionally at least one ethylene and/or $C_4$ to $C_{12}$ α-olefin obtaining thereby the second polypropylene fraction, preferably said second polypropylene fraction is a second propylene homopolymer, said first polypropylene fraction and said second polypropylene fraction form the (semi)crystalline polypropylene (H-PP1), i.e. the matrix of the heterophasic composition (HECO),
(d) transferring the (semi)crystalline polypropylene (PP1) of step (c) into a third reactor (R3),
(e) polymerizing in the third reactor (R3) and in the presence of the (semi)crystalline polypropylene (PP1) obtained in step (c) propylene and ethylene obtaining thereby a first elastomeric propylene copolymer fraction, the first elastomeric propylene copolymer fraction is dispersed in the (semi)crystalline polypropylene (PP1),
(f) transferring the (semi)crystalline polypropylene (PP1) in which the first elastomeric propylene copolymer fraction is dispersed in a fourth reactor (R4), and
(g) polymerizing in the fourth reactor (R4) and in the presence of the mixture obtained in step (e) propylene and ethylene obtaining thereby the second elastomeric propylene copolymer fraction, the first and the second elastomeric propylene copolymer fraction form together the elastomeric propylene copolymer (EPR); the (semi)crystalline polypropylene (PP1) and the elastomeric propylene copolymer (EPR) form the heterophasic composition (HECO).

Of course, in the first reactor (R1) the second polypropylene fraction can be produced and in the second reactor (R2) the first polypropylene fraction can be obtained. The same holds true for the elastomeric propylene copolymer phase. Accordingly in the third reactor (R3) the second elastomeric propylene copolymer fraction can be produced whereas in the fourth reactor (R4) the first elastomeric propylene copolymer fraction is made.

Preferably between the second reactor (R2) and the third reactor (R3) and optionally between the third reactor (R3) and fourth reactor (R4) the monomers are flashed out.

The term "sequential polymerization process" indicates that the heterophasic composition (HECO) is produced in at least two, like three or four reactors connected in series. Accordingly the present process comprises at least a first reactor (R1) and a second reactor (R2), more preferably a first reactor (R1), a second reactor (R2), a third reactor (R3) and a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer.

According to the present invention the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) and the fourth reactor (R4) are preferably gas phase reactors (GPR).

Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2), the third reactor (R3) and the fourth reactor (R4) are gas phase reactors (GPR). Accordingly for the instant process at least four, preferably four polymerization reactors, namely a slurry reactor (SR), like a loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

In another preferred embodiment the first reactor (R1) and second reactor (R2) are slurry reactors (SR), like a loop reactors (LR), whereas the third reactor (R3) and the fourth reactor (R4) are gas phase reactors (GPR). Accordingly for the instant process at least four, preferably four polymerization reactors, namely two slurry reactors (SR), like two loop reactors (LR), first gas phase reactor (GPR-1) and a second gas phase reactor (GPR-2) connected in series are used. If needed prior to the first slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic composition (HECO) as defined above the conditions for the first reactor (R1), i.e. the slurry reactor (SR), like a loop reactor (LR), of step (a) may be as follows:
the temperature is within the range of 50° C. to 110° C., preferably between 60° C. and 100° C., more preferably between 68 and 95° C.,
the pressure is within the range of 20 bar to 80 bar, preferably between 40 bar to 70 bar,
hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:
the temperature is within the range of 50° C. to 130° C., preferably between 60° C. and 100° C.,
the pressure is within the range of 5 bar to 50 bar, preferably between 15 bar to 35 bar, hydrogen can be added for controlling the molar mass in a manner known per se.

The condition in the third reactor (R3) and the fourth reactor (R4), preferably in the second gas phase reactor (GPR-2) and third gas phase reactor (GPR-3), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step.

However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic composition (HECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention for preparing the heterophasic composition (HECO) is prepared by a) reacting a spray crystallized or emulsion solidified adduct of $MgCl_2$ and a $C_1$-$C_2$ alcohol with $TiCl_4$ b) reacting the product of stage a) with a dialkylphthalate of formula (I)

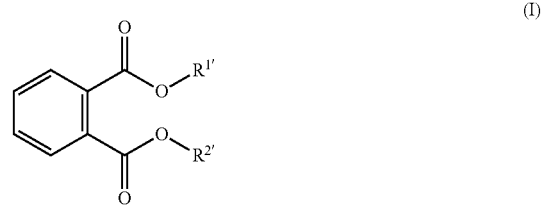

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor c) washing the product of stage b) or d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2$*nROH, wherein R is methyl or ethyl, preferably ethyl and n is 1 to 6, is contacting with $TiCl_4$ to form a titanized carrier, followed by the steps of adding to said titanised carrier
  (i) a dialkylphthalate of formula (I) with $R^{1'}$ and $R^{2'}$ being independently at least a $C_5$-alkyl, like at least a $C_8$-alkyl, or preferably
  (ii) a dialkylphthalate of formula (I) with $R^{1'}$ and $R^{2'}$ being the same and being at least a $C_5$-alkyl, like at least a $C_5$-alkyl, or more preferably
  (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product, subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

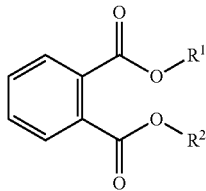

(II)

with $R^1$ and $R^2$ being methyl or ethyl, preferably ethyl, the dialkylphthalat of formula (II) being the internal donor and recovering said transesterification product as the procatalyst composition (component (i)).

The adduct of the formula $MgCl_2 \cdot nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the heterophasic composition (HECO) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by $$Si(OCH_3)_2R_2^5 \qquad (IIIa)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by $$Si(OCH_2CH_3)_3(NR^xR^y) \qquad (IIIb)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor is of formula (IIIa), like dicyclopentyl dimethoxy silane $[Si(OCH_3)_2(\text{cyclo-pentyl})_2]$, diisopropyl dimethoxy silane $[Si(OCH_3)_2(CH(CH_3)_2)_2]$.

Most preferably the external donor is dicyclopentyl dimethoxy silane $[Si(OCH_3)_2(\text{cyclo-pentyl})_2]$.

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic composition (HECO) according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

The Plastomer (PL)

As mentioned above, the properties of the plastomer (PL) change due to the use of the peroxide (PO). That is the properties defined in this section may differ after the plastomer (PL) has been treated with the peroxide (PO). In particular the density as well as the melt flow rate MFR2 (190° C.) is affected. However the comonomer content is not affected.

The plastomer (PL) can be any elastomeric polyolefin with the proviso that it chemically differs from the elastomeric ethylene/propylene copolymer (EPR) as defined herein. More preferably the plastomer (PL) is a very low density polyolefin, more preferably a very low density polyolefin polymerized using single site, preferably metallocene catalysis. Typically, the plastomer (PL) is an ethylene copolymer.

In a preferred embodiment, the plastomer (PL) has a density below 0.868 g/cm³. More preferably, the density of the plastomer (PL) is equal or below 0.860 g/cm³, still more preferably in the range of 0.845 to 0.860 g/cm³, like in the range of 0.850 to 0.860 g/cm³.

Preferably, the plastomer (PL) has a melt flow rate $MFR_2$ (190° C., 2.16 kg) of less than 50 g/10 min, more preferably from 0.1 to 20 g/10 min, still more preferably from 0.1 to 10 g/10 min, like a range from 0.1 to 5 g/10 min.

Preferably, the plastomer (PL) comprises units derived from ethylene and a C4 to C20 α-olefin.

The plastomer (PL) comprises, preferably consists of, units derivable from (i) ethylene and (ii) at least another C4 to C20 α-olefin, like C4 to C10 α-olefin, more preferably units derivable from (i) ethylene and (ii) at least another α-olefin selected form the group consisting of 1-butene, 1-pentene, 1-hexene, 1-heptene and 1-octene. It is especially preferred that the plastomer (PL) comprises at least units derivable from (i) ethylene and (ii) 1-butene or 1-octene.

In an especially preferred embodiment, the plastomer (PL) consists of units derivable from (i) ethylene and (ii) 1-butene or 1-octene.

The comonomer content, like the C4 to C20 α-olefin content, of the plastomer (PL) is in the range of 8 to 30 mol-%, more preferably in the range of 10 to 25 mol-%, still more preferably in the range of 11 to 23 mol-%, like in the range of 12 to 20 mol-%.

In one preferred embodiment the elastomer (E) is prepared with at least one metallocene catalyst. The elastomer (E) may also be prepared with more than one metallocene catalyst or may be a blend of multiple elastomers prepared with different metallocene catalysts. In some embodiments, the elastomer (E) is a substantially linear ethylene polymer (SLEP). SLEPs and other metallocene catalysed elastomers (E) are known in the art, for example, U.S. Pat. No. 5,272,236. These resins are also commercially available, for example, as Queo™ plastomers available from Borealis, ENGAGE™ plastomer resins available from Dow Chemical Co. or EXACT™ polymers from Exxon or TAFMER™ polymers from Mitsui.

The Inorganic Filler (F)

As a further requirement of the composition according to this invention is the presence of an inorganic filler (F).

Preferably the inorganic filler (F) is a mineral filler. It is appreciated that the inorganic filler (F) is a phyllosilicate, mica or wollastonite. Even more preferred the inorganic filler (F) is selected from the group consisting of mica, wollastonite, kaolinite, smectite, montmorillonite and talc. The most preferred the inorganic filler (F) is talc.

It is appreciated that the filler (F) has median particle size ($D_{50}$) in the range of 0.8 to 20 µm and a top cut particle size ($D_{95}$) in the range of 10 to 20 m, preferably a median particle size ($D_{50}$) in the range of 5.0 to 8.0 µm and top cut particle size ($D_{95}$) in the range of 12 to 17 µm, more preferably a median particle size ($D_{50}$) in the range of 5.5 to 7.8 µm and top cut particle size ($D_{95}$) of 13 to 16.5 µm.

According to this invention the filler (F) does not belong to the class of alpha nucleating agents (NU) and additives (AD).

The the filler (F) is state of the art and a commercially available product.

The Alpha Nucleating Agents (NU)

In one embodiment of the invention the composition (C) comprises alpha-nucleating agent, more preferably the composition is free of beta-nucleating agent.

According to this invention the alpha nucleating agent (NU) is not an additive (AD).

The alpha-nucleating agent is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]-nonitol, and
(iii) salts of diesters of phosphoric acid, e.g. sodium 2,2'-methylenebis (4,6-di-tert-butylphenyl) phosphate or aluminium-hydroxy-bis[2,2'-methylene-bis(4,6-di-t-butylphenyl)phosphate], and
(iv) vinylcycloalkane polymer or vinylalkane polymer, and
(v) mixtures thereof.

Preferably the alpha-nucleating agent comprised in the composition of the invention is vinylcycloalkane polymer and/or vinylalkane polymer, more preferably vinylcycloalkane polymer, like vinylcyclohexane (VCH) polymer. Vinyl cyclohexane (VCH) polymer is particularly preferred as α-nucleating agent. It is appreciated that the amount of vinylcycloalkane, like vinylcyclohexane (VCH), polymer and/or vinylalkane polymer, more preferably of vinylcyclohexane (VCH) polymer, in the composition is not more than 500 ppm, preferably not more than 200 ppm, more preferably not more than 100 ppm, like in the range of 0.1 to 500 ppm, preferably in the range of 0.5 to 200 ppm, more preferably in the range of 1 to 100 ppm. Furthermore, it is appreciated that the vinylcycloalkane polymer and/or vinylalkane polymer is introduced into the composition by the BNT technology. With regard to the BNT-technology reference is made to the international applications WO 99/24478, WO 99/24479 and particularly WO 00/68315. According to this technology a catalyst system, preferably a Ziegler-Natta procatalyst, can be modified by polymerizing a vinyl compound in the presence of the catalyst system, comprising in particular the special Ziegler-Natta procatalyst, an external donor and a cocatalyst, which vinyl compound has the formula:

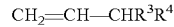

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is preferably used for the preparation of the heterophasic composition (HECO) present in the modified polypropylene composition (mPP). The polymerized vinyl compound acts as an alpha-nucleating agent. The weight ratio of vinyl compound to solid catalyst component in the modification step of the catalyst is preferably of up to 5 (5:1), more preferably up to 3 (3:1), like in the range of 0.5 (1:2) to 2 (2:1).

Such nucleating agents are commercially available and are described, for example, in "Plastic Additives Handbook", 5th edition, 2001 of Hans Zweifel (pages 967 to 990).

Additives (AD)

In addition to the modified polypropylene composition (mPP) and the inorganic filler (F) the composition (C) of the invention may include additives (AD). Typical additives are acid scavengers, antioxidants, colorants, light stabilisers, plasticizers, slip agents, anti-scratch agents, dispersing agents, processing aids, lubricants, pigments, and the like. As indicated above the inorganic filler (F) is not regarded as an additive (AD).

Such additives are commercially available and for example described in "Plastic Additives Handbook", 6$^{th}$ edition 2009 of Hans Zweifel (pages 1141 to 1190).

Furthermore, the term "additives (AD)" according to the present invention also includes carrier materials, in particular polymeric carrier materials.

The Polymeric Carrier Material

Preferably the composition (C) of the invention does not comprise (a) further polymer (s) different to modified polypropylene composition (mPP), i.e. different to the heterophasic composition (HECO) and the plastomer (PL), in an amount exceeding 15 wt.-%, preferably in an amount exceeding 10 wt.-%, more preferably in an amount exceeding 9 wt.-%, based on the weight of the composition (C). If an additional polymer is present, such a polymer is typically a polymeric carrier material for the peroxide (PO) and the additives (AD). Any carrier material for additives (AD) is not calculated to the amount of polymeric compounds as indicated in the present invention, but to the amount of the respective additive.

Accordingly in the present invention it is distinguished between the polymeric carrier material of the peroxide (PO) and the additives (AD). As mentioned above, the polymeric carrier material of the peroxide (PO) is considered separately, whereas the polymeric carrier material of the additives (AD) is regarded as part of said additives (AD).

The polymeric carrier material of the additives (AD) is a carrier polymer to ensure a uniform distribution in the composition (C) of the invention. The polymeric carrier material is not limited to a particular polymer. The polymeric carrier material may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

The Article

The composition (C) of the present invention is preferably used for the production of articles, more preferably of molded articles, yet more preferably of injection molded articles. Even more preferred is the use for the production of parts of washing machines or dishwashers as well as automotive articles, especially of car interiors and exteriors, like bumpers, side trims, step assists, body panels, spoilers, dashboards, interior trims and the like.

The current invention also provides articles, more preferably molded articles, like injection molded articles, comprising, preferably comprising at least 60 wt.-%, more preferably at least 80 wt.-%, yet more preferably at least 95 wt.-%, like consisting of, the inventive composition (C). Accordingly the present invention is especially directed to parts of washing machines or dishwashers as well as to automotive articles, especially to car interiors and exteriors, like bumpers, side trims, step assists, body panels, spoilers, dashboards, interior trims and the like, comprising, preferably comprising at least 60 wt.-%, more preferably at least 80 wt.-%, yet more preferably at least 95 wt.-%, like consisting of, the inventive composition (C).

The Use

The present invention is also directed to the use of a peroxide (PO) to reduce tigerskin of a polypropylene composition (PP) wherein a composition (C) is obtained, said composition (C) comprising a modified polypropylene composition (mPP) and an inorganic filler (F). Concerning the definition of the composition (C), the modified polypropylene composition (mPP), the polypropylene composition (PP) and the inorganic filler (F) reference is made to the information provided above.

The reduction of tigerskin is preferably accomplished in case of MSE values equal or below 30, more preferably in the range of 1 to 20, yet more preferably in the range of 1 to 5 for the composition (C).

The present invention will now be described in further detail by the examples provided below.

EXAMPLES

1. Definitions/Measuring Methods

The following definitions of terms and determination methods apply for the above general description of the invention as well as to the below examples unless otherwise defined.

Quantification of Polymer Microstructure by NMR Spectroscopy

Quantitative nuclear-magnetic resonance (NMR) spectroscopy was used to quantify the comonomer content of the polymers. Quantitative $^{13}C$ {$^1H$} NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C$ {$^1H$} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}$C $\{^1\text{H}\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the Use of this Set of Sites the Corresponding Integral Equation Becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol }\%]=100*fE$$

The weight percent comonomer incorporation was calculated from the mole fraction:

$$E[\text{wt }\%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Calculation of Ethylene Content of the Ethylene/Propylene Copolymer (EPR):

$$\frac{C(P) - w(A)xC(A)}{w(B)} = C(B)$$

wherein w(A) is the weight fraction [in wt.-%] of the (semi)crystalline polypropylene (PP1), w(B) is the weight fraction [in wt.-%] of the ethylene/propylene copolymer (EPR), C(A) is the comonomer content [in mol-%] of the (semi) crystalline polypropylene (PP1), C(P) is the comonomer content [in mol-%] of the heterophasic composition (HECO), C(B) is the calculated comonomer content [in mol-%] of the ethylene/propylene copolymer (EPR).

Quantification of of Comonomer Content in Plastomer by NMR Spectroscopy

Quantitative nuclear-magnetic resonance (NMR) spectroscopy was used to quantify the comonomer content of the polymers. Quantitative $^{13}$C $\{^1\text{H}\}$ NMR spectra recorded in the molten-state using a Bruker Advance III 500 NMR spectrometer operating at 500.13 and 125.76 MHz for $^1$H and $^{13}$C respectively. All spectra were recorded using a $^{13}$C optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification [Klimke, K., Parkinson, M., Piel, C., Kaminsky, W., Spiess, H. W., Wilhelm, M., Macromol. Chem. Phys. 2006; 207:382; Parkinson, M., Klimke, K., Spiess, H. W., Wilhelm, M., Macromol. Chem. Phys. 2007; 208:2128; Castignolles, P., Graf, R., Parkinson, M., Wilhelm, M., Gaborieau, M., Polymer 50 (2009) 2373]. Standard single-pulse excitation was employed utilising the transient NOE at short recycle delays of 3 s [Pollard, M., Klimke, K., Graf, R., Spiess, H. W., Wilhelm, M., Sperber, O., Piel, C., Kaminsky, W., Macromolecules 2004; 37:813; Klimke, K., Parkinson, M., Piel, C., Kaminsky, W., Spiess, H. W., Wilhelm, M., Macromol. Chem. Phys. 2006; 207:382] and the RS-HEPT decoupling scheme[Filip, X., Tripon, C., Filip, C., J. Mag. Resn. 2005, 176, 239, Griffin, J. M., Tripon, C., Samoson, A., Filip, C., and Brown, S. P., Mag. Res. in Chem. 2007 45, S1, S198]. A total of 1024 (1 k) transients were acquired per spectrum. This setup was chosen due its high sensitivity towards low comonomer contents. Quantitative $^{13}$C $\{^1\text{H}\}$ NMR spectra were processed, integrated and quantitative properties determined using custom spectral analysis automation programs. All chemical shifts are internally referenced to the bulk methylene signal ($\delta$+) at 30.00 ppm [J. Randall, Macromol. Sci., Rev. Macromol. Chem. Phys. 1989, C29, 201]. Characteristic signals corresponding to the incorporation of comonomers were observed [J. Randall, Macromol. Sci., Rev. Macromol. Chem. Phys. 1989, C29, 201] and all contents calculated with respect to all other monomers present in the polymer. [For further information see Zhou, Z., Kuemmerle, R., Qiu, X., Redwine, D., Cong, R., Taha, A., Baugh, D. Winniford, B., J. Mag. Reson. 187 (2007) 225 and Busico, V., Carbonniere, P., Cipullo, R., Pellecchia, R., Severn, J., Talarico, G., Macromol. Rapid Commun. 2007, 28, 1128]

Comonomer content in plastomer (PL) was measured in a known manner based on Fourier transform infrared spectroscopy (FTIR) calibrated with $^{13}$C-NMR, using Nicolet Magna 550 IR spectrometer together with Nicolet Omnic FTIR software. Films having a thickness of about 250 μm were compression molded from the samples. Similar films were made from calibration samples having a known content of the comonomer. The comonomer content was determined from the spectrum from the wave number range of from 1430 to 1100 cm$^{-1}$. The absorbance is measured as the height of the peak by selecting the so-called short or long base line or both. The short base line is drawn in about 1410-1320 cm$^{-1}$ through the minimum points and the long base line about between 1410 and 1220 cm$^{-1}$. Calibrations need to be done specifically for each base line type. Also, the comonomer content of the unknown sample needs to be within the range of the comonomer contents of the calibration samples.

MFR$_2$ (230° C.) is measured according to ISO 1133 (230° C., 2.16 kg load).

MFR$_2$ (190° C.) is measured according to ISO 1133 (190° C., 2.16 kg load).

The xylene cold solubles (XCS, wt.-%): Content of xylene cold solubles (XCS) is determined at 25° C. according to ISO 16152; first edition; 2005-07-01.

Intrinsic viscosity is measured according to DIN ISO 1628/1, October 1999 (in Decalin at 135° C.).

Density is measured according to ISO 1183-187. Sample preparation is done by compression moulding in accordance with ISO 1872-2:2007.

Flexural Modulus: The flexural modulus was determined in 3-point-bending according to ISO 178 on injection molded specimens of 80×10×4 mm prepared in accordance with ISO 294-1:1996.

Charpy notched impact strength is determined according to ISO 180/1A at 23° C. by using injection moulded test specimens as described in EN ISO 1873-2 (80×10×4 mm).

Shrinkage: The shrinkage is determined on centre gated, injection moulded circular disks (diameter 180 mm, thickness 3 mm, having a flow angle of 355° and a cut out of 5°). Two specimens are moulded applying two different holding pressure times (10 s and 20 s respectively). The melt temperature at the gate is 260° C., and the average flow front velocity in the mould 100 mm/s. Tool temperature: 40° C., back pressure: 600 bar.

After conditioning the specimen at room temperature for 96 hours the dimensional changes radial and tangential to the flow direction are measured for both disks. The average of respective values from both disks are reported as final results.

The glass transition temperature (Tg) is determined by dynamic mechanical analysis according to ISO 6721-7. The measurements are done in torsion mode on compression moulded samples (40×40×1 mm$^3$) between −100° C. and +150° C. with a heating rate of 2° C./min and a frequency of 1 Hz.

Coefficient of linear thermal expansion: The coefficient of linear thermal expansion (CLTE) was determined in accordance with ISO 11359-2:1999 on 10 mm long pieces cut from the same injection molded specimens as used for the tensile modulus determination. The measurement was performed in a temperature range from −30 to +80° C. at a heating rate of 1° C./min and a temperature range from 23 to +80° C. at a heating rate of 1° C./min in mashine direction, respectively.

Flow Marks

The tendency to show flow marks was examined with a method as described below. This method is described in detail in WO 2010/149529, which is incorporated herein in its entirety.

An optical measurement system, as described by Sybille Frank et al. in PPS 25 Intern. Conf. Polym. Proc. Soc 2009 or Proceedings of the SPIE, Volume 6831, pp 68130T-68130T-8 (2008) was used for characterizing the surface quality.

This Method Consists of Two Aspects:

1. Image recording:

The basic principle of the measurement system is to illuminate the plates with a defined light source (LED) in a closed environment and to record an image with a CCD-camera system.

2. Image Analysis:

The specimen is floodlit from one side and the upwards reflected portion of the light is deflected via two mirrors to a CCD-sensor. The such created grey value image is analyzed in lines. From the recorded deviations of grey values the mean square error (MSE) is calculated allowing a quantification of surface quality, i.e. the larger the MSE value the more pronounced is the surface defect.

Generally, for one and the same material, the tendency to flow marks increases when the injection speed is increased.

For this evaluation plaques 440×148×2.8 mm with grain VW K50 and a filmgate of 1.4 mm were used and were produced with different filling times of 1.5, 3 and 6 sec respectively.

Further Conditions:

Melt temperature: 240° C.
Mould temperature 30° C.
Dynamic pressure: 10 bar hydraulic The smaller the MSE value is at a certain filling time, the smaller is the tendency for flow marks.

The Particle Size median ($D_{50}$) and top cut ($D_{95}$) are calculated from the particle size distribution determined by laser diffraction according to ISO 13320-1:1999.

2. Examples

Preparation of HECO1
Catalyst 80 mg of ZN104-catalyst of LyondellBasell is activated for 5 minutes with a mixture of Triethylaluminium (TEAL; solution in hexane 1 mol/l) and Dicyclopentyldimethoxysilane as donor (0.3 mol/l in hexane)—in a molar ratio of 18.7 (Co/ED) after a contact time of 5 min and 10 ml hexane in a catalyst feeder. The molar ratio of TEAL and Ti of catalyst is 220 (Co/TC)). After activation the catalyst is spilled with 250 g propylene into the stirred reactor with a temperature of 23° C. Stirring speed is hold at 250 rpm. After 6 min prepolymersation at 23° C. the polymerisation starts as indicated in table 1.

TABLE 1

Polymerization of HECO1

|  |  | HECO1 |
| --- | --- | --- |
| Prepoly |  |  |
| Residence time | [h] | 0.27 |
| Temperature | [° C.] | 28 |
| Co/ED ratio | [mol/mol] | 5.90 |
| Co/TC ratio | [mol/mol] | 395 |
| Loop (R1) |  |  |
| Residence time | [h] | 0.29 |
| Temperature | [° C.] | 61 |
| $H_2/C_3$ ratio | [mol/kmol] | 4.06 |
| MFR | [g/10 min] | 43 |
| XCS | [wt %] | 3.2 |
| C2 content | [mol %] | 0 |
| 1$^{st}$ GPR (R2) |  |  |
| Residence time | [h] | 0.28 |
| Temperature | [° C.] | 80 |
| Pressure | [kPa] | 1400 |
| $H_2/C_3$ ratio | [mol/kmol] | 28 |
| MFR | [g/10 min] | 36 |
| XCS | [wt %] | 3.1 |
| C2 content | [mol %] | 0 |
| 2$^{nd}$ GPR (R3) |  |  |
| Residence time | [h] | 0.60 |
| Temperature | [° C.] | 59 |
| Pressure | [kPa] | 1400 |
| $C_2/C_3$ ratio | [mol/kmol] | 546 |
| $H_2/C_2$ ratio | [mol/kmol] | 487 |
| MFR | [g/10 min] | 18 |
| XCS | [wt %] | 22.5 |
| C2 content | [mol %] | 0 |
| 3$^{rd}$ GPR (R4) |  |  |
| Residence time | [h] | 0.48 |
| Temperature | [° C.] | 80 |
| Pressure | [kPa] | 1500 |

TABLE 1-continued

| Polymerization of HECO1 | | |
|---|---|---|
| | | HECO1 |
| $C_2/C_3$ ratio | [mol/kmol] | 550 |
| $H_2/C_2$ ratio | [mol/kmol] | 485 |
| $MFR_2$ | [g/10 min] | 13 |
| XCS | [wt %] | 30.9 |
| C2 content | [mol %] | 22.2 |

Preparation of HECO2

Catalyst

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold TiCl was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP 491566, EP 591224 and EP 586390.

The catalyst was further modified (VCH modification of the catalyst). 35 ml of mineral oil (Paraffinum Liquidum PL68) was added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst prepared above (Ti content 1.4 wt.-%) was added and after additionally 20 minutes 5.0 g of vinylcyclohexane (VCH) was added. The temperature was increased to 60° C. during 30 minutes and was kept there for 20 hours. Finally, the temperature was decreased to 20° C. and the concentration of unreacted VCH in the oil/catalyst mixture was analysed and was found to be 200 ppm weight.

TABLE 2

| Polymerization of HECO2 | | |
|---|---|---|
| | | HECO2 |
| Prepoly | | |
| Residence time | [h] | 0.08 |
| Temperature | [° C.] | 30 |
| Co/ED ratio | [mol/mol] | 7.3 |
| Co/TC ratio | [mol/mol] | 220 |
| Loop (R1) | | |
| Residence time | [h] | 0.6 |
| Temperature | [° C.] | 72 |
| $H_2/C_3$ ratio | [mol/kmol] | 14.8 |
| MFR | [g/10 min] | 55 |
| XCS | [wt %] | 2.0 |
| C2 content | [mol %] | 0 |
| Split | [wt %] | 30 |
| $1^{st}$ GPR (R2) | | |
| Residence time | [h] | 0.75 |
| Temperature | [° C.] | 80 |
| Pressure | [kPa] | 2231 |
| $H_2/C_3$ ratio | [mol/kmol] | 149.7 |

TABLE 2-continued

| Polymerization of HECO2 | | |
|---|---|---|
| | | HECO2 |
| MFR | [g/10 min] | 55 |
| XCS | [wt %] | 2.0 |
| C2 content | [mol %] | 0 |
| Split | [wt %] | 35 |
| $2^{nd}$ GPR (R3) | | |
| Residence time | [h] | 0.6 |
| Temperature | [° C.] | 70 |
| Pressure | [kPa] | 2291 |
| $C_2/C_3$ ratio | [mol/kmol] | 584.6 |
| $H_2/C_2$ ratio | [mol/kmol] | 116.5 |
| MFR | [g/10 min] | 11 |
| XCS | [wt %] | 18 |
| C2 content | [mol %] | 17.5 |
| split | [wt %] | 20 |
| $3^{rd}$ GPR (R4) | | |
| Residence time | [h] | 0.6 |
| Temperature | [° C.] | 85 |
| Pressure | [kPa] | 1421 |
| $C_2/C_3$ ratio | [mol/kmol] | 585.2 |
| $H_2/C_2$ ratio | [mol/kmol] | 92.7 |
| $MFR_2$ | [g/10 min] | 11 |
| XCS | [wt %] | 32 |
| C2 content | [mol %] | 18.5 |
| split | [wt %] | 15 |

The HECO1 and HECO2 powder were stabilized in a twin-screw extruder with a standard additive packing including 0.1 wt % pentaerythrityl-tetrakis(3-(3',5'-di-tert. butyl-4-hydroxyphenyl)-propionate supplied by Songwong, 0.1 wt % tris (2,4-di-t-butylphenyl) phosphite supplied by HPL Additives, and 0.05 wt % calcium stearate supplied by Croda.

TABLE 3

| Properties of HECO 1 and HECO2 | | | |
|---|---|---|---|
| HECO | | HECO1 | HECO2 |
| MFR | [g/10 min] | 12 | 11 |
| C2 content | [mol %] | 22 | 18.5 |
| XCS | [wt %] | 30 | 32 |
| C2 content of XCS | [mol %] | 62.5 | 48 |
| IV of XCS | [dl/g] | 2.3 | 3.3 |

Preparation of the modified polypropylene composition (mPP)

Example CE1 (Comparative)

97.5 wt.-% of HECO2 and 2.0 wt.-% of the ethylene-butene copolymer Engage HM 7487 by Dow, 0.2 wt.-% of Pentaerythrityl-tetrakis(3-(3',5'-di-tert. butyl-4-hydroxyphenyl)-propionate (Songnox 1010FF by Songwon), 0.1 wt.-% of Tris (2,4-di-t-butylphenyl) phosphite (Kinox-68-G by HPL Additives), and 0.2 wt.-% of antistatic agent Dimodan HP FF by Danisco were melt blended on a co-rotating twin screw extruder. The polymer melt mixture was discharged and pelletized.

Example IE1 (Inventive)

To a mixture of 95.5 wt.-% of HECO2 and 2 wt.-% of the ethylene-butene copolymer Engage HM 7487 by Dow, 2.0 wt.-% of a masterbatch of 1 wt.-% 2,5-dimethyl-2,5-di-(tert-butylperoxy)hexane with polypropylene, 0.2 wt.-% of Pentaerythrityl-tetrakis(3-(3',5'-di-tert. butyl-4-hydroxyphenyl)-propionate (Songnox 1010FF by Songwon), 0.1 wt.-% of Tris (2,4-di-t-butylphenyl) phosphite (Kinox-68-G by HPL Additives), and 0.2 wt.-% of antistatic agent Dimodan HP FF by Danisco were dosed in the main hopper of a twin screw extruder Mega Compounder ZSK 18 (screw length 40 D) with a temperature profile 20/190/220/225/230/230/210/200° C. and a screw speed of 300 rpm. The polymer melt mixture was discharged and pelletized.

Example IE2 (Inventive)

To a mixture of 92.5 wt.-% of HECO2 and 2 wt.-% of the ethylene-butene copolymer Engage HM 7487 by Dow, 5.0 wt.-% of a masterbatch of 1 wt.-% 2,5-dimethyl-2,5-di-(tert-butylperoxy)hexane with polypropylene, 0.2 wt.-% of Pentaerythrityl-tetrakis(3-(3',5'-di-tert. butyl-4-hydroxyphenyl)-propionate (Songnox 1010FF by Songwon), 0.1 wt.-% of Tris (2,4-di-t-butylphenyl) phosphite (Kinox-68-G by HPL Additives), and 0.2 wt.-% of antistatic agent Dimodan HP FF by Danisco were dosed in the main hopper of a twin screw extruder Mega Compounder ZSK 18 (screw length 40 D) with a temperature profile 20/190/220/225/230/230/210/200° C. and a screw speed of 300 rpm. The polymer melt mixture was discharged and pelletized.

Example IE3 (Inventive)

To a mixture of 90.5 wt.-% of HECO2 and 2 wt.-% of the ethylene-butene copolymer Engage HM 7487 by Dow, 7.0 wt.-% of a masterbatch of 1 wt.-% 2,5-dimethyl-2,5-di-(tert-butylperoxy)hexane with polypropylene, 0.2 wt.-% of Pentaerythrityl-tetrakis(3-(3',5'-di-tert. butyl-4-hydroxyphenyl)-propionate (Songnox 1010FF by Songwon), 0.1 wt.-% of Tris (2,4-di-t-butylphenyl) phosphite (Kinox-68-G by HPL Additives), and 0.2 wt.-% of antistatic agent Dimodan HP FF by Danisco were dosed in the main hopper of a twin screw extruder Mega Compounder ZSK 18 (screw length 40 D) with a temperature profile 20/190/220/225/230/230/210/200° C. and a screw speed of 300 rpm. The polymer melt mixture was discharged and pelletized.

Example IE4 (Inventive)

To a mixture of 91.0 wt.-% of HECO2 7.0 wt.-% of a masterbatch of 1 wt.-% 2,5-dimethyl-2,5-di-(tert-butylperoxy)hexane with polypropylene, 0.2 wt.-% of Pentaerythrityl-tetrakis(3-(3',5'-di-tert. butyl-4-hydroxyphenyl)-propionate (Songnox 1010FF by Songwon), 0.1 wt.-% of Tris (2,4-di-t-butylphenyl) phosphite (Kinox-68-G by HPL Additives), and 0.2 wt.-% of antistatic agent Dimodan HP FF by Danisco were dosed in the main hopper of a twin screw extruder Mega Compounder ZSK 18 (screw length 40 D) with a temperature profile 20/190/220/225/230/230/210/200° C. and a screw speed of 300 rpm. The polymer melt mixture was discharged and pelletized.

TABLE 4

Compositions of the comparative and inventive examples of the modified polypropylene composition (mPP)

|  | CE1 | IE1 | IE2 | IE3 | IE4 |
| --- | --- | --- | --- | --- | --- |
| HECO2 [wt.-%] | 97.5 | 95.5 | 92.5 | 90.5 | 92.5 |
| PL1 [wt.-%] | 2 | 2 | 2 | 2 | — |
| POX PP [wt.-%] | — | 2 | 5 | 7 | 7 |
| Additives [wt.-%] | 0.5 | 0.5 | 0.5 | 0.5 | 0.5 |

PL1 is the commercial ethylene-butene copolymer Engage HM 7487 by Dow having a density of 0.860 g/cm$^3$, a melt flow rate MFR$_2$ (190° C.) of 2.0 g/10 min and an 1-butene content of 19.1 mol-%.

POX PP is a masterbatch of 1 wt.-% 2,5-dimethyl-2,5-di-(tert-butylperoxy)hexane with polypropylene Additives is a masterbatch of Pentaerythrityl-tetrakis(3-(3',5'-di-tert. butyl-4-hydroxyphenyl)-propionate (Songnox 1010FF by Songwon), Tris (2,4-di-t-butylphenyl) phosphite (Kinox-68- G by HPL Additives) and antistatic agent Dimodan HP FF by Danisco in a ratio as described above with regard to the individual examples.

TABLE 5

Properties of comparative and inventive modified polypropylene composition (mPP)

|  |  | CE1 | IE1 | IE2 | IE3 | IE4 |
| --- | --- | --- | --- | --- | --- | --- |
| MFR$_2$ | [g/10 min] | 9 | 15 | 26 | 35 | 40 |
| XCS | [wt.-%] | 32.8 | 32.2 | 31.4 | 30.9 | 29.5 |
| IV(XCS) | [dl/g] | 3.31 | 2.83 | 2.67 | 2.57 | 2.45 |
| IV(XCI) | [dl/g] | 1.39 | 1.43 | 1.57 | 1.35 | 1.25 |
| IV(XCS)/IV(XCI) | [—] | 2.38 | 1.97 | 1.70 | 1.90 | 1.96 |
| C2 (XCS) | [mol-%] | 50.0 | 50.0 | 50.0 | 50.0 | 48.9 |
| C2 (XCI) | [mol-%] | 9.0 | 8.6 | 8.8 | 8.2 | 9.0 |
| C2 total | [mol-%] | 19.2 | 19.3 | 18.8 | 17.4 | 18.6 |
| Charpy NIS (23° C.) | [kJ/m$^2$] | 66 | 64 | 62 | 59 | 55 |
| Flexural Modulus | [MPa] | 913 | 899 | 885 | 874 | 903 |
| Tg | ° C. | −50 | −48 | −48 | −48 | −48 |
| MSE (3) | [—] | 10 | 6 | 6 | 6 | 6 |

Preparation of the Composition (C)

Example CE2 (Comparative)

60.5 wt.-% of HECO2, 2 wt.-% of the ethylene-octene copolymer Queo8230 by Borealis and 35 wt.-% of Talc (Jetfine TICA by Imerys), 2.0 wt.-% of a masterbatch of 70 wt % of linear density polyethylene (LDPE) and 30 wt % carbon black, 0.2 wt.-% of Pentaerythrityl-tetrakis(3-(3',5'-di-tert. butyl-4-hydroxyphenyl)-propionate (Songnox 1010FF by Songwon), 0.1 wt.-% of Tris (2,4-di-t-butylphenyl) phosphite (Kinox-68-G by HPL Additives), and 0.2 wt.-% of antistatic agent Dimodan HP FF by Daniscowere melt blended on a co-rotating twin screw extruder. The polymer melt mixture was discharged and pelletized.

Example CE3 (Comparative)

47 wt.-% of HECO1, 7 wt.-% of the ethylene-octene copolymer Engage 8100 by Dow, 10 wt.-% of propylene homopolymer HL512FB by Borealis, 32 wt.-% of Talc (Steamic T1CA by Imerys), 3.0 wt.-% of a masterbatch of 70 wt % of linear density polyethylene (LDPE) and 30 wt % carbon black, 0.4 wt.-% of the UV-stabilizer masterbatch Cyasorb UV-3808PP5 by Cytec, 0.1 wt.-% of Pentaerythrityl-tetrakis(3-(3',5'-di-tert. butyl-4-hydroxyphenyl)-propionate (Songnox 1010FF by Songwon), 0.1 wt.-% of Tris (2,4-di-t-butylphenyl) phosphite (Kinox-68-G by HPL Additives), 0.2 wt.-% of Oleamide 9-octadecenamide by Croda and 0.2 wt.-% of antistatic agent Dimodan HP FF by Danisco on a co-rotating twin screw extruder, discharged and pelletized were melt blended on a co-rotating twin screw extruder. The polymer melt mixture was discharged and pelletized.

Example IE5 (Inventive)

To a mixture of 57.8 wt.-% of HECO2 and 2 wt.-% of the ethylene-butene copolymer Engage HM 7487 by Dow, 2.7 wt.-% of a masterbatch of 1 wt.-% 2,5-dimethyl-2,5-di-(tert-butylperoxy)hexane with polypropylene, 2.0 wt.-% of a masterbatch of 70 wt % of linear density polyethylene (LDPE) and 30 wt % carbon black, 0.2 wt.-% of Pentaerythrityl-tetrakis(3-(3',5'-di-tert. butyl-4-hydroxyphenyl)-propionate (Songnox 1010FF by Songwon), 0.1 wt.-% of Tris (2,4-di-t-butylphenyl) phosphite (Kinox-68-G by HPL Additives), and 0.2 wt.-% of antistatic agent Dimodan HP FF by Danisco were dosed in the main hopper of a twin screw extruder Mega Compounder ZSK 18 (screw length 40 D) with a temperature profile 20/190/220/225/230/230/210/200° C. and a screw speed of 300 rpm. The polymer melt mixture was melt blended with 35 wt.-% of Talc (Jetfine T1CA by Imerys) on a co-rotating twin screw extruder, discharged and pelletized.

Example IE6 (Inventive)

To a mixture of 53.5 wt.-% of HECO2 and 2 wt.-% of the ethylene-butene copolymer Engage HM 7487 by Dow, 7 wt.-% of a masterbatch of 1 wt.-% 2,5-dimethyl-2,5-di-(tert-butylperoxy)hexane, 2.0 wt.-% of a masterbatch of 70 wt % of linear density polyethylene (LDPE) and 30 wt % carbon black, 0.2 wt.-% of Pentaerythrityl-tetrakis(3-(3',5'-di-tert. butyl-4-hydroxyphenyl)-propionate (Songnox 1010FF by Songwon), 0.1 wt.-% of Tris (2,4-di-t-butylphenyl) phosphite (Kinox-68-G by HPL Additives), and 0.2 wt.-% of antistatic agent Dimodan HP FF by Danisco with polypropylene were dosed in the main hopper of a twin screw extruder Mega Compounder ZSK 18 (screw length 40 D) with a temperature profile 20/190/220/225/230/230/210/200° C. and a screw speed of 300 rpm. The polymer melt mixture was melt blended with 35 wt.-% of Talc (Jetfine T1CA by Imerys) on a co-rotating twin screw extruder, discharged and pelletized.

Example IE7 (Inventive)

To a mixture of 50.5 wt.-% of HECO2 and 4 wt.-% of the ethylene-octene copolymer Engage 8842 by Dow, 8 wt.-% of a masterbatch of 1 wt.-% 2,5-dimethyl-2,5-di-(tert-butylperoxy)hexane with polypropylene, 2.0 wt.-% of a masterbatch of 70 wt % of linear density polyethylene (LDPE) and 30 wt % carbon black, 0.2 wt.-% of Pentaerythrityl-tetrakis(3-(3',5'-di-tert. butyl-4-hydroxyphenyl)-propionate (Songnox 1010FF by Songwon), 0.1 wt.-% of Tris (2,4-di-t-butylphenyl) phosphite (Kinox-68-G by HPL Additives), and 0.2 wt.-% of antistatic agent Dimodan HP FF by Danisco were dosed in the main hopper of a twin screw extruder Mega Compounder ZSK 18 (screw length 40 D) with a temperature profile 20/190/220/225/230/230/210/200° C. and a screw speed of 300 rpm. The polymer melt mixture was melt blended with 35 wt.-% of Talc (Jetfine T1CA by Imerys) on a co-rotating twin screw extruder, discharged and pelletized.

TABLE 6

Compositions of the comparative and inventive examples of the composition (C)

| | CE2 | CE3 | IE5 | IE6 | IE7 |
|---|---|---|---|---|---|
| HECO1 [wt.-%] | | 47 | | | |
| HECO2 [wt.-%] | 60.5 | | 57.8 | 53.5 | 50.5 |
| PL1 [wt.-%] | | | 2 | 2 | |
| PL2 [wt.-%] | 2 | | | | |
| PL3 [wt.-%] | | 7 | | | |
| PL4 [wt.-%] | | | | | 4 |
| Homo-PP [wt.-%] | | 10 | | | |
| Talc1 [wt.-%] | 35 | | 35 | 35 | 35 |
| Talc2 [wt.-%] | | 32 | | | |
| POX PP[wt.-%] | | | 2.7 | 7 | 8 |
| Pigments [wt.-%] | 2 | 3 | 2 | 2 | 2 |
| Additives [wt.-%] | 0.5 | 1 | 0.5 | 0.5 | 0.5 |

PL1 is the commercial ethylene-butene copolymer Engage HM 7487 by Dow having a density of 0.860 g/cm$^3$, a melt flow rate MFR$_2$ (190° C.) of 2.0 g/10 min and an 1-butene content of 19.1 mol-%.
PL2 is the commercial ethylene-octene copolymer Queo8230 by Borealis having a density of 0.880 g/cm$^3$, a melt flow rate MFR$_2$ (190° C.) of 30.0 g/10 min and an 1-octene content of 7.0 mol-%.
PL3 is the commercial ethylene-octene copolymer Engage 8100 by Dow having a density of 0.870 g/cm$^3$, a melt flow rate MFR$_2$ (190° C.) of 1.0 g/10 min and an 1-octene content of 11.0 mol-%.
PL4 is the commercial ethylene-octene copolymer Engage 8842 by Dow having a density of 0.857 g/cm$^3$, a melt flow rate MFR$_2$ (190° C.) of 1.0 g/10 min.
Homo-PP is the commercial propylene homopolymer HL512FB by Borealis having a MFR$_2$ (230° C.) of 1200 g/10 min.
Talc1 is the commercial Talc Jetfine T1CA by Imerys having a d50 (Sedigraph 5100) of 1.40 µm and d95 (Sedigraph 5100) of 5.5 µm.
Talc2 is the commercial Talc Steamic T1CA by Imerys having a d50 (Sedigraph 5100) of 1.8 µm and d95 (Sedigraph 5100) of 6.2 µm (measured on compacted material)
POX PP is a masterbatch of 1 wt.-% 2,5-dimethyl-2,5-di-(tert-butylperoxy)hexane with polypropylene
Pigments is a masterbatch of 70 wt % of linear density polyethylene (LDPE) and 30 wt % carbon black, with MFR (190°/21.6 kg) of 15 g/10 min.
Additives is a masterbatch of Pentaerythrityl-tetrakis(3-(3',5'-di-tert. butyl-4-hydroxyphenyl)-propionate (Songnox 1010FF by Songwon), Tris (2,4-di-t-butylphenyl) phosphite (Kinox-68- G by HPL Additives) and antistatic agent Dimodan HP FF by Danisco in a ratio as described above with regard to the individual examples.

TABLE 7

Properties of comparative and inventive compositions (C)

| | | CE2 | CE3 | IE5 | IE6 | IE7 | IE8 |
|---|---|---|---|---|---|---|---|
| MFR$_2$ | [g/10 min] | 8 | 20 | 13 | 19 | 18 | 24 |
| Charpy NIS (23° C.) | [kJ/m$^2$] | 33 | 20 | 20 | 19 | 20 | 9 |
| Flexural Modulus | [MPa] | 2750 | 2215 | 2880 | 2913 | 2608 | 3041 |

TABLE 7-continued

Properties of comparative and inventive compositions (C)

|  |  | CE2 | CE3 | IE5 | IE6 | IE7 | IE8 |
|---|---|---|---|---|---|---|---|
| CLTE | μm/mK | 53 | 47 | 43 | 42 | 41 | 40 |
| MSE (3) | [—] | 80 | 50 | 9.0 | 3.0 | 3.7 | 3.0 |

What is claimed is:

1. A composition comprising a modified polypropylene composition and an inorganic filler, wherein the modified polypropylene composition is obtained by treatment of a polypropylene composition with a peroxide, the polypropylene composition comprising:
    (a) a heterophasic composition comprising:
        (a1) a (semi)crystalline polypropylene and
        (a2) an ethylene/propylene copolymer dispersed in the (semi)crystalline polypropylene, and
    (b) a plastomer being a copolymer of ethylene and at least one C4 to C20 α-olefin, the plastomer having a melt flow rate $MFR_2$ (190° C., 2.16 kg) of from 0.1 to 5 g/10 min,
    wherein the polypropylene composition comprises the heterophasic composition and the plastomer in a weight ratio of 8.0 to 50.0, and
    wherein the intrinsic viscosity (IV) determined according to DIN ISO 1628/1 (in Decalin at 135° C.) of the xylene soluble fraction (XCS) of the modified polypropylene composition is below 3.3 dl/g.

2. The composition according to claim 1, wherein the melt flow rate $MFR_2$ (230° C.) of the modified polypropylene composition measured according to ISO 1133 is above 9.0 g/10 min.

3. The composition according to claim 1, wherein the plastomer is a copolymer of ethylene and 1-butene or 1-octene.

4. The composition according to claim 1, wherein the polypropylene composition comprises the heterophasic composition and the plastomer in a weight ratio of 12.0 to 50.0.

5. The composition according to claim 1, having a melt flow rate $MFR_2$ (230° C.) measured according to ISO 1133 in the range of 5 to 30 g/10 min.

6. The composition according to claim 1, wherein the ratio IV(XCS)/IV(XCI) of the modified polypropylene composition is below 2.3, wherein IV(XCS) is the intrinsic viscosity determined according to DIN ISO 1628/1 (in Decalin at 135° C.) of the xylene soluble fraction (XCS) and IV(XCI) is the intrinsic viscosity determined according to DIN ISO 1628/1 (in Decalin at 135° C.) of the xylene insoluble fraction (XCI).

7. The composition according to claim 1, comprising:
    (a) 35 to 80 wt.-% of the modified polypropylene composition, and
    (b) 20 to 50 wt.-% of the inorganic filler, based on the total weight of the composition.

8. The composition according to claim 1, wherein the heterophasic composition has:
    (a) a comonomer content, based on the total weight of the heterophasic composition, in the range of 10 to 30 mol-%, and/or
    (b) a xylene soluble fraction (XCS) in the range of 24 to 45 wt.-%, and/or
    (c) a melt flow rate $MFR_2$ (230° C.) measured according to ISO 1133 from 5 to 30 g/10 min.

9. The composition according to claim 1, wherein the xylene soluble fraction (XCS) of the heterophasic composition has:
    (a) an intrinsic viscosity in the range of 1.5 to 4.5 dl/g, and
    (b) a comonomer content, based on the total weight of the xylene soluble fraction (XCS) of the heterophasic composition, in the range of 30 to 60 mol-%.

10. The composition according to claim 1, wherein the plastomer has:
    (a) a comonomer content, based on the total weight of the plastomer, in the range of 8 to 30 mol-%, and
    (b) a density below 0.868 $g/cm^3$.

11. The composition according to claim 1, wherein the inorganic filler is talc.

12. An injection moulded automotive article comprising a composition comprising:
    a modified polypropylene composition and an inorganic filler, wherein the modified polypropylene composition is obtained by treatment of a polypropylene composition with a peroxide, the polypropylene composition comprising:
        (a) a heterophasic composition comprising:
            (a1) a (semi)crystalline polypropylene and
            (a2) an ethylene/propylene copolymer dispersed in the (semi)crystalline polypropylene, and
        (b) a plastomer being a copolymer of ethylene and at least one C4 to C20 α-olefin, the plastomer having a melt flow rate $MFR_2$ (190° C., 2.16 kg) of from 0.1 to 5 g/10 min,
        wherein the polypropylene composition comprises the heterophasic composition and the plastomer in a weight ratio of 8.0 to 50.0, and
        wherein the intrinsic viscosity determined according to DIN ISO 1628/1 (in Decalin at 135° C.) of the xylene soluble fraction (XCS) of the modified polypropylene composition is below 3.3 dl/g.

13. A process for the preparation of the composition according to claim 1, wherein
    (a)
        (a1) the polypropylene composition, comprising the heterophasic composition and the plastomer in a weight ratio of 8.0 to 50.0, is extruded in an extruder in the presence of the peroxide to obtain the modified polypropylene composition, and
        (a2) the modified polypropylene composition is melt blended with the inorganic filler,
    or
    (b) the polypropylene composition comprising the heterophasic composition and the plastomer and the inorganic filler, wherein the polypropylene composition comprises the heterophasic composition and the plastomer in a weight ratio of 8.0 to 50.0 are extruded in an extruder in the presence of the peroxide.

14. The process according to claim 13, wherein the peroxide is an alkyl peroxide.

15. The process according to claim 13, wherein the peroxide is 2,5-dimethyl-2,5-di-(tert-butylperoxy)hexane.

16. The process according to claim 13, wherein the peroxide reduces tigerskin in the polypropylene composition.

17. The process according to claim 16, wherein the reduction of tigerskin is characterized by a mean square error values equal to or below 30 for a gray scale image of the polypropylene composition.

* * * * *